Aug. 19, 1952 H. A. BARKUS 2,607,105
ADJUSTABLE LATHE TAILSTOCK AND COMBINATION TOOL
Filed Oct. 31, 1949
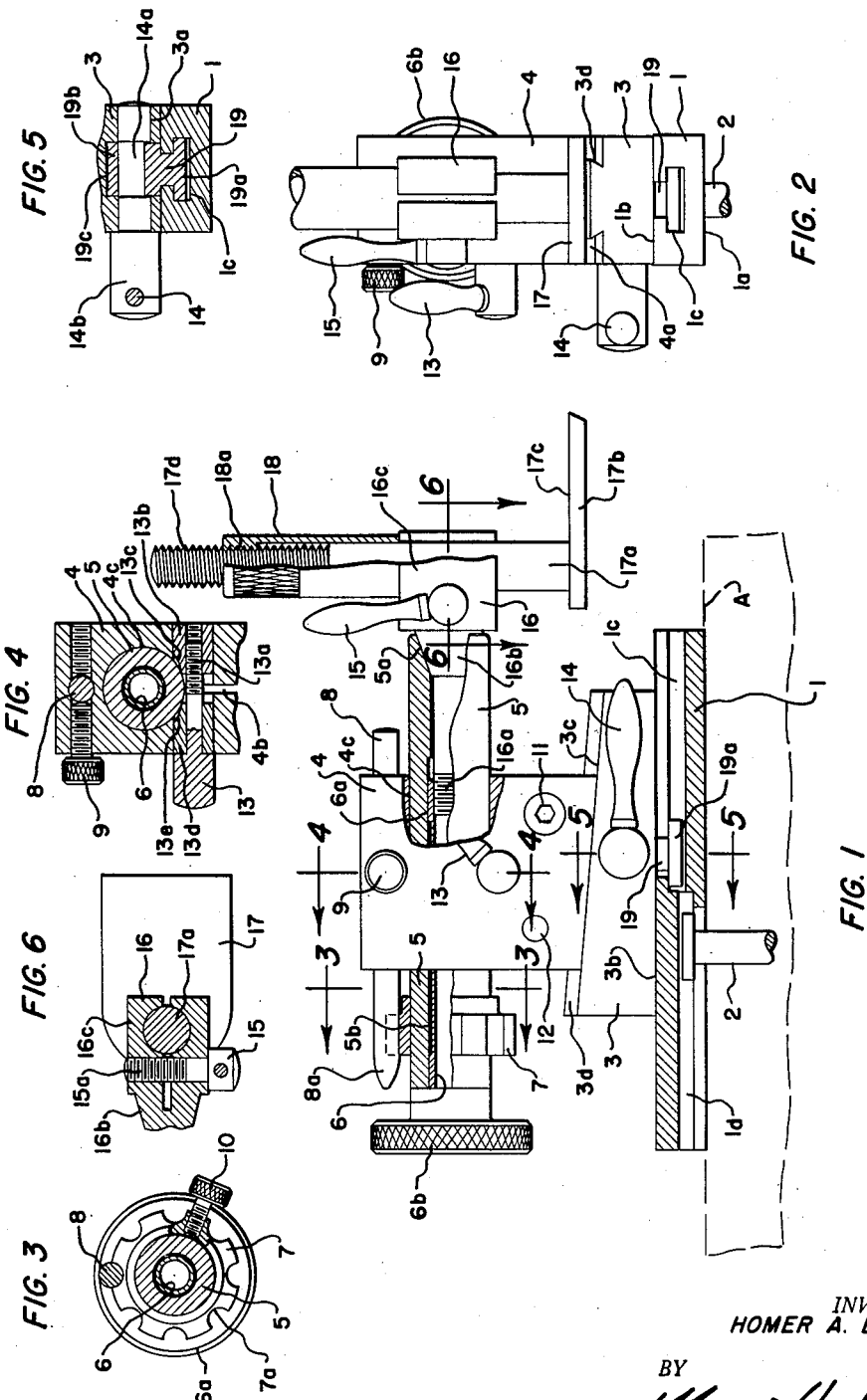
INVENTOR.
HOMER A. BARKUS
BY
Wm. H. Dean
AGENT Patented Aug. 19, 1952

2,607,105

UNITED STATES PATENT OFFICE 2,607,105

ADJUSTABLE LATHE TAILSTOCK AND COMBINATION TOOL

Homer A. Barkus, San Diego, Calif.

Application October 31, 1949, Serial No. 124,698

4 Claims. (Cl. 29—27)

My invention relates to an adjustable lathe tailstock and combination tool, more particularly for use in connection with watchmaker's lathes, or the like, and the objects of my invention are:

First, to provide a tailstock and combination tool which will take the place of the conventional tailstock on various watchmaker's lathes;

Second, to provide an adjustable lathe tailstock and combination tool of this class which is provided with means for adjusting the axis of the tailstock vertically to provide for alignment thereof with the headstock axis;

Third, to provide an adjustable lathe tailstock and combination tool of this class which may be easily aligned by inserting a true bar in the chuck of the headstock and tailstock concurrently, and setting the tailstock in accordance therewith, whereby very accurate alignment of the axes of the lathe headstock and said tailstock is accomplished;

Fourth, to provide an adjustable lathe tailstock and combination tool which readily receives chucks and collets which may alternately be used in the headstock of a conventional watchmaker's lathe;

Fifth, to provide an adjustable lathe tailstock and combination tool of this class which is provided with index means which may be used in machining rectangular in cross-section portions on various bars, and stems, or the like;

Sixth, to provide a tool of this class which may be used for brooch sharpening;

Seventh, to provide a tool of this class which may be used for screw-head polishing;

Eighth, to provide an adjustable lathe tailstock and combination tool of this class which greatly facilitates the operation of sawblades, grinding wheels, laps and various polishing devices carried by the lathe headstock chuck adjacent to said combination tool;

Ninth, to provide an adjustable lathe tailstock and combination tool of this class which may be used for various milling and surface grinding operations;

Tenth, to provide an adjustable lathe tailstock and combination tool of this class which may be used for very accurately repointing the balance shafts of alarm clocks or the like;

Eleventh, to provide a tool of this class which may be used to true up eccentric clock or watch escape wheels and train wheels or the like, so that they run concentric of their own axes;

Twelfth, to provide a tool of this class which may be used as an indexing head for various drilling operations;

Thirteenth, to provide a tool of this class which is very readily and easily used as a pivot polishing attachment for a watchmaker's lathe; and Fourteenth, to provide an adjustable lathe tailstock and combination tool of this class which is very simple and economical of construction, efficient in operation, and which will not readily deteriorate or get out of order.

With these and other objects in view, as will appear hereinafter, my invention consists of certain novel features of construction, combination and arrangement of parts and portions, as will be hereinafter described in detail and particularly set forth in the appended claims, reference being had to the accompanying drawings and to the characters of reference thereon, forming a part of this application, in which:

Fig. 1 is a side elevational view of my adjustable lathe tailstock and combination tool, showing portions thereof broken away and in section to amplify the illustration; Fig. 2 is an end elevational view thereof, showing portions thereof broken away to facilitate the illustration; Fig. 3 is a sectional view, taken from the line 3—3 of Fig. 1; Fig. 4 is a fragmentary sectional view, taken from the line 4—4 of Fig. 1; Fig. 5 is a fragmentary sectional view, taken from the line 5—5 of Fig. 1; and Fig. 6 is a fragmentary plan sectional view, taken from the line 6—6 of Fig. 1.

Similar characters of reference refer to similar parts and portions throughout the several views of the drawings.

The base plate 1, holddown bolt 2, incline member 3, frame 4, shaft 5, drawbar 6, index members 7 and 8, set screws 9 and 10, bolts 11 and 12, blocking arms 13, 14 and 15, collet fixture 16, work support 17, adjusting sleeve 18, and the holddown member 19 constitute the principal parts and portions of my adjustable lathe tailstock and combination tool.

The base plate 1 is an elongated rectangular plate, having substantially flat upper and lower sides 1a and 1b, and this plate, as shown in Fig. 2 of the drawings, is substantially rectangular in cross-section. This base plate 1, communicating with the upper side thereof and one end thereof, is provided with an open T-slotted portion 1c. Communicating with the lower side 1a of this base plate 1, and the opposite end thereof, is the open T-slot 1d, as shown in Fig. 1 of the drawings. Positioned in the T-slot 1d is the holddown bolt 2, which is a substantially conventional holddown bolt, as disclosed in my co-pending application, Serial No. 33,811, filed June 18, 1948, for Tool Post Holddown, now abandoned.

The holddown member 19 is provided with a T-head 19a engaged in the T-slot 1c, as shown in Fig. 2 of the drawings, and this holddown member 19, as shown in Fig. 5 of the drawings, is provided with an upwardly extending shank 19b, having a bore 19c through which an eccentric portion 14a of the horizontal shaft 14b of the locking arm 14 extends. At opposite sides of this eccentric portion 14a the shaft 14b is revolubly mounted on a horizontal axis transversely within the bore portion 3a of the incline member 3. The incline member 3 is provided with a flat lower surface 3b, resting on the upper surface 1b of the base plate 1, and this incline member 3 is provided with an inclined upper surface 3c, having dove-tailed ways 3d thereon. These dove-tailed ways 3d are engaged by conforming ways portions 4a in the lower end of the frame 4, which is inclined in conforming relationship with the upper inclined surface 3c of the incline member 3.

The frame 4 is provided with a centrally slotted portion 4b, which is centrally of the dove-tailed ways portion 3d of the incline member 3, and the bolts 11 and 12 extend through the frame 4, abridging the slotted portion 4b for forcefully compressing the ways portions 4a in secure engaged relation with the dove-tailed ways 3d of the incline member 3. Communicating with the upper end of the slotted portion 4b is the circular in cross-section bore 4c, which extends horizontally through the frame 4, all as shown best in Figs. 1 and 4 of the drawings. Reciprocally and revolubly mounted in this bore 4c is the shaft 5, which is a hollow shaft having an internally tapered collet receiving end portion 5a, and a bore 5b concentrically therewith and extending therethrough to the opposite end thereof.

The draw bar 6 is a hollow cylindrical member, having an internally screw threaded portion 6a, adapted to engage the external screw thread 16a of the collet fixture 16, or any other conventional collet shank which is externally screw threaded. Fixed to the normally rear end of the draw bar 6 is a knurled hand wheel 6b, which provides for manual tightening of the draw bar 6 when firmly engaging a collet in the tapered bore portion 5a hereinbefore described. Fixed to the outer side of the shaft 6 by means of the set screw 10 is the indexing member 7, which is provided with a plurality of equally spaced notches 7a in its periphery. These notches 7a are engageable with the pin index member 8 in a very precise manner. The tolerance fit of these indexing members 7 and 8 provides for certain precise setting of the shaft 5 within the frame 4. One end of the indexing member 8 is provided with a tapered portion 8a, which facilitates the engagement of the indexing member 7 therewith when moved longitudinally of the axis thereof during reciprocal movement of the shaft 5 within the bore portion 4c of the frame 4.

The set screw 9 fixes the indexing member 8 within the frame 4, all as shown best in Fig. 4 of the drawings. As shown in Figs. 1 and 4 of the drawings, the locking arm 13 is provided with an integral externally screw threaded shaft 13a, which extends through the frame 4, abridging the slotted portion 4b therein. Externally screw threaded on this portion 13a is a nut 13b, having an arcuate recess 13c, which conforms to the outer arcuate surface of the shaft 5, and opposed to this nut 13b is a secondary nut 13d, having an arcuate recess 13e conforming to the outer arcuate surface of the shaft 5. It will be noted that the nut 13d is abutted to the head portion of the locking arm 13, so that rotation of the externally screw threaded portion 13a forces the nuts 13b and 13d together, engaging the arcuate surfaces 13c and 13e with the outer side of the shaft 5 for locking the same in the bore portion 4c in the frame 4.

The collet fixture 16, integral with its externally screw threaded shank portion 16a, is provided with an externally tapered collet head portion 16b, which conforms with the internally tapered bore portion 5a in one end of the shaft 5. Integral with the tapered head portion 16b is a rectangular split head portion 16c, through which the externally screw threaded stud portion 15a of the locking arm 15 extends for clamping opposite sides of the portion 16c securely on the shaft portion 17a of the work support 17. This work support 17 is provided with a flat plate 17b having a work supporting surface 17c on the upper side thereof, to which various elements may be adhered or clamped, as desired.

The opposite end of the shaft portion 17a is provided with an external screw thread 17d, engaged by the internally screw threaded bore portion 18a of the adjusting sleeve 18, the lower end of which bears against the collet fixture 16, providing vertical adjustment of the work support 17, as desired.

The operation of my adjustable lathe tailstock and combination tool is substantially as follows: The base plate 1, may be fixed, by means of the holddown bolt 2, in various positions longitudinally of the lathe bed ways, a indicated by dash lines A in Fig. 1 of the drawings. The incline member 3 may be rotatably moved, and fixed on the upper surface of the base plate 3b by means of the holddown member 19, which serves as a pivot and a fixture for clamping the incline member 3 in certain position either parallel to or angularly disposed to the axis of the lathe headstock. Vertical alignment of the axis of the shaft 5 with the axis of the lathe headstock may be accomplished by moving the frame 4, at its ways portions 4a, on the dove-tailed ways 3d of the incline member 3. When certain vertical alignment of the shaft 5 is accomplished relative to the axis of the lathe headstock, the bolts 11 and 12 may be tightened, clamping the ways portions 4a on the dove-tailed ways 3d of the incline member 3.

The shaft 5, at its tapered bore portion 5a, may optionally receive the collet fixture 16, or any other conventional chuck or collet common to a watchmaker's lathe, and this shaft 5 may be reciprocated or rotated as desired, or may be indexed in any certain position desired by means of the indexing members 7 and 8, it being noted that the notches 7a in the indexing member 7 may be varied in their peripheral spacing, as desired, and it is obvious that the tool may be equipped with several of these indexing members 7 to provide for different indexing head operations, as desired. The shaft 5 may be fixed in position by means of the locking arm 13, as hereinbefore described, and the indexing member 8 may be removed by loosening the set screw 9, if desired, permitting complete rotation of the shaft 5, together with the particular collet supported therein by means of the draw bar 6, which is a substantially conventional draw bar structure.

It is to be noted that a collet or chuck may be placed in the tapered bore portion 5a of the shaft 5, and that a true bar may be placed in the chuck at the headstock of the lathe, and the true bar may then be engaged by the collet or chuck in the shaft 5 and adjustments may be made vertically by means of the frame 4 in engagement with the inclined dove-tailed ways 3d, while angular alignment may be made by rotation of the incline member 3 about the axis of the holddown member 19. After such alignment adjustments have been made, the adjustments may be fixed by means of the bolts 11 and 12, and the locking arm 14, all of which aligns and fixes precise alignment of the shaft 5 and the lathe headstock at their axes.

When it is desired to repoint the balance of an alarm clock, it may be fixed in a collet or chuck positioned in the bore 5a of the shaft 5, and the taper angle of the balance may be provided for by pivoting the incline member 3 about the axis of the holddown member 19, so that the end of the balance may be advanced into contact with a grinding wheel supported in the headstock of the lathe, and the shaft 5 may be rotated during the finish grinding of the balance points, which renews an old worn balance with a minimum amount of effort, and renders the same very accurate and precise.

For the purpose of index drilling, the axis of the shaft 5 may be vertically offset relatively to the axis of the lathe headstock by means of the inclined ways 3d of the incline member 3. The index members 7 and 8 may be employed to index the shaft 5 for locating the work held in the chuck secured to the shaft 5, a drill may be placed in the headstock chuck of the lathe, and the shaft 5 may be successively reciprocated in the bore 4c of the frame 4 and progressively rotated from one index notch 7a to the next one, each time engaging the respective notch 7a with the index member 8, whereupon each reciprocal movement of the shaft 5 may accomplish the drilling of a hole in the work at a precise indexed location.

When it is desired to perform milling or grinding operations, the work may be placed on the plate surface 17c of the work support 17, and may be vertically adjusted by means of the adjusting sleeve 18, engaging the collet fixture 16, which accomplishes longitudinal movement of the shaft 17a through the collet fixture urged by the helical screw threads 17d and 18a. The shaft 17a may be fixed in certain adjusted position by means of the locking arm 15, and its respective screw threaded portion 15a, as hereinbefore described, and illustrated in Fig. 6 of the drawings. Work pieces may be fixed to the plate portion 17c in various ways, as desired, either by clamping the same thereto or adhering parts to the surface 17c, if desired.

It will be noted that various angular relationships of the work as presented to various tools in the headstock of the lathe may be accomplished by pivoting the work support 17 about the axis of the collet fixture 16 in the tapered bore 5a of the shaft 5, and other angular disposition may be accomplished on a vertical axis by means of the holddown member 19, which promotes the pivotal relationship of the incline member 3 upon the base plate 1, as hereinbefore described.

It is obvious that numerous drilling, machining and grinding operations may be performed by means of my adjustable lathe tailstock and combination tool which have not been hereinbefore described.

Though I have shown and described a particular construction, combination and arrangement of parts and portions, I do not wish to be limited to this particular construction, combination and arrangement, but desire to include in the scope of my invention the construction, combination and arrangement substantially as set forth in the appended claims.

Having thus described my invention, what I claim as new and desire to secure by Letters Patent is:

1. In an adjustable lathe tailstock and combination tool, a base plate, holddown means for securing said base plate on the lathe bed ways of a conventional watchmaker's lathe, and in longitudinal adjustable relationship therewith an incline member pivotally secured to said base plate, and adjustably mounted on a vertical axis relative thereto, said incline member having an upper inclined ways portion, a frame having conforming ways portions engaging said inclined ways of said incline member, and a collet receiving shaft reciprocally and revolubly mounted in said frame on a horizontal axis, adapted to be aligned with the headstock axis of the lathe on which it is mounted, a draw bar in said shaft, said shaft having a tapered open bore portion in the opposite end thereof from said draw bar adapted to receive collets or the like, an index member on the outer side of said shaft, having notch portions in the periphery thereof, and a secondary index member on said frame engageable with said notch portions when said shaft is reciprocated in said frame.

2. In an adjustable lathe tailstock and combination tool, a base plate, holddown means for securing said base plate on the lathe bed ways of a conventional watchmaker's lathe, and in longitudinal adjustable relationship therewith an incline member pivotally secured to said base plate, and adjustably mounted on a vertical axis relative thereto, said incline member having an upper inclined ways portion, a frame having conforming ways portions engaging said inclined ways of said incline member, and a collet receiving shaft reciprocally and revolubly mounted in said frame on a horizontal axis, adapted to be aligned with the headstock axis of the lathe on which it is mounted, a draw bar in said shaft, said shaft having a tapered open bore portion in the opposite end thereof from said draw bar adapted to receive collets or the like, an index member on the outer side of said shaft, having notch portions in the periphery thereof, and a secondary index member on said frame engageable with said notch portions when said shaft is reciprocated in said frame, a locking arm, having a screw threaded portion extending through said frame adapted to clamp said shaft in fixed position relative thereto.

3. In an adjustable lathe tailstock and combination tool, a base plate, holddown means for securing said base plate on the lathe bed ways of a conventional watchmaker's lathe, and in longitudinal adjustable relationship therewith an incline member pivotally secured to said base plate, and adjustably mounted on a vertical axis relative thereto, said incline member having an upper inclined ways portion, a frame having conforming ways portions engaging said inclined ways of said incline member, and a collet receiving shaft reciprocally and revolubly mounted in said frame on a horizontal axis, adapted to be aligned with the headstock axis of the lathe on which it is mounted, a draw bar in said shaft, said shaft having a tapered open bore portion in the opposite end thereof from said draw bar adapted to receive collets or the like, an index member on the outer side of said shaft, having notch portions in the periphery thereof, and a secondary index member on said frame engageable with said notch portions when said shaft is reciprocated in said frame, a locking arm, having a screw threaded portion extending through said frame adapted to clamp said shaft in fixed position relative thereto, a collet fixture engaged in said tapered bore portion of said shaft having a work support reciprocally mounted therein at right angles to the axis of said shaft, provided with a flat work supporting plate thereon.

4. In an adjustable lathe tailstock and combination tool, a base plate, holddown means for securing said base plate on the lathe bed ways of a conventional watchmaker's lathe, and in longitudinal adjustable relationship therewith an incline member pivotally secured to said base plate, and adjustably mounted on a vertical axis relative thereto, said incline member having an upper inclined ways portion, a frame having conforming ways portions engaging said inclined ways of said incline member, and a collet receiving shaft reciprocally and revolubly mounted in said frame on a horizontal axis, adapted to be aligned with the headstock axis of the lathe on which it is mounted, a draw bar in said shaft, said shaft having a tapered open bore portion in the opposite end thereof from said draw bar adapted to receive collets or the like, an index member on the outer side of said shaft, having notch portions in the periphery thereof, and a secondary index member on said frame engageable with said notch portions when said shaft is reciprocated in said frame, a locking arm, having a screw threaded portion extending through said frame adapted to clamp said shaft in fixed position relative thereto, a collet fixture engaged in said tapered bore portion of said shaft having a work support reciprocally mounted therein at right angles to the axis of said shaft, provided with a flat work supporting plate thereon, means for adjusting said plate laterally of the axis of said shaft.

HOMER A. BARKUS.

REFERENCES CITED

The following references are of record in the file of this patent:

UNITED STATES PATENTS

| Number | Name | Date |
|---|---|---|
| 507,047 | Strickland | Oct. 17, 1893 |
| 647,644 | Blount | Apr. 17, 1900 |
| 1,005,504 | Blugok | Oct. 10, 1911 |
| 1,028,728 | Hughes | June 4, 1912 |
| 1,358,164 | Kottinger | Nov. 9, 1920 |
| 2,035,999 | Tiefenbacher | Mar. 31, 1936 |

FOREIGN PATENTS

| Number | Country | Date |
|---|---|---|
| 17,298 | Great Britain | of 1901 |